(12) United States Patent
Dykes

(10) Patent No.: US 10,025,392 B1
(45) Date of Patent: Jul. 17, 2018

(54) ERGONOMIC COMPUTER KEYBOARD

(71) Applicant: Frederick Dykes, Great Falls, VA (US)

(72) Inventor: Frederick Dykes, Great Falls, VA (US)

( * ) Notice: Subject to any disclaimer, the term of this patent is extended or adjusted under 35 U.S.C. 154(b) by 0 days.

(21) Appl. No.: 15/900,420

(22) Filed: Feb. 20, 2018

(51) Int. Cl.
*H03K 17/94* (2006.01)
*H03M 11/00* (2006.01)
*G06F 3/02* (2006.01)
*H01H 13/84* (2006.01)
*H01H 13/86* (2006.01)
*H01H 13/83* (2006.01)

(52) U.S. Cl.
CPC ........... *G06F 3/0219* (2013.01); *H01H 13/84* (2013.01); *H01H 13/86* (2013.01); *H01H 13/83* (2013.01); *H01H 2217/012* (2013.01); *H01H 2231/002* (2013.01)

(58) Field of Classification Search
CPC ...... G06F 3/0219; H01H 13/84; H01H 13/86; H01H 13/83; H01H 2217/012; H01H 2231/002
See application file for complete search history.

(56) References Cited

U.S. PATENT DOCUMENTS

| | | | |
|---|---|---|---|
| 3,945,482 A | 3/1976 | Einbinder | |
| 4,824,268 A | 4/1989 | Diernisse | |
| 5,302,040 A * | 4/1994 | Louis | B41J 5/10 345/168 |
| 5,318,367 A * | 6/1994 | Braun | B41J 5/105 341/20 |
| 5,426,449 A * | 6/1995 | Danziger | G06F 3/0213 341/20 |
| D372,911 S | 8/1996 | Wang | |
| 5,660,488 A * | 8/1997 | Miller | G06F 3/0219 340/407.2 |
| 5,689,253 A * | 11/1997 | Hargreaves | B41J 5/10 341/22 |
| D399,838 S | 10/1998 | Tsai | |
| 6,005,496 A * | 12/1999 | Hargreaves | G06F 3/0202 341/22 |
| 6,067,033 A | 5/2000 | An | |
| 6,084,576 A * | 7/2000 | Leu | G06F 3/0219 341/22 |
| 6,542,091 B1 * | 4/2003 | Rasanen | G06F 3/0219 341/22 |
| 6,677,927 B1 * | 1/2004 | Bruck | G06F 1/1664 345/156 |
| 6,712,534 B2 * | 3/2004 | Patel | G06F 3/021 341/72 |

(Continued)

*Primary Examiner* — Quang D Pham

(57) ABSTRACT

The ergonomic computer keyboard is configured for use with a computer. The ergonomic computer keyboard is adapted for use with a person. The ergonomic computer keyboard is an interface device that enables a person to use the computer. The ergonomic computer keyboard comprises a housing and a key set. The key set is installed in the housing. The orientation of the key set is set such that the angle of attack of a finger to a key selected from the key set key is adjusted relative to a traditional computer keyboard. This adjusted orientation results in a more natural orientation of the hands to the key set relative to the traditional computer keyboard. The ordering of the indicia of each key in the key set is adjusted relative to the QWERTY ordering such that hand movements are minimized during the typing process.

16 Claims, 5 Drawing Sheets

(56) References Cited

U.S. PATENT DOCUMENTS

| | | | |
|---|---|---|---|
| 6,867,763 B2* | 3/2005 | Griffin | G06F 1/1626 |
| | | | 345/168 |
| 8,766,823 B2* | 7/2014 | Zilberman | G06F 21/316 |
| | | | 341/20 |
| 2005/0122313 A1* | 6/2005 | Ashby | G06F 3/0219 |
| | | | 345/168 |
| 2012/0293417 A1* | 11/2012 | Dennis | G06F 17/276 |
| | | | 345/168 |
| 2016/0103503 A1 | 4/2016 | Pham | |
| 2017/0185163 A1 | 6/2017 | Firmin | |

\* cited by examiner

ERGONOMIC COMPUTER KEYBOARD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including electrical digital data processing and input arrangements for interaction between a person and a computer, more specifically, a programmable keyboard.

A traditional computer keyboard is a well-known interface device used with computers. The traditional computer keyboard comprises a key set that further comprises a plurality of keys. Each key selected from the key set actuates a momentary switch when a user presses the selected key. The computer monitors the traditional computer keyboard. The computer uses the activation of a key, or the simultaneous activation of a plurality of keys, to take a preprogrammed set of actions.

Most traditional computer keyboards have a rectilinear block shape. The key set mounts on the superior surface of the keyboard such that a user may readily access the key set. The size of the most common key sets ranges from 78 keys to 109 keys (inclusive). For clarity, this disclosure assumes the use of a 104 key computer keyboard. Those skilled in the electrical arts will recognize that the innovations contained within this disclosure are readily adapted for key sets of different size without undue experimentation.

The key set of a traditional computer keyboard arranges the keys within the key set in a series of perpendicular rows and staggered columns. The traditional computer keyboard is further defined with a keyboard bisector line. In ideal conditions, the keyboard bisector line is aligned with the line formed by the sagittal plane and the transverse plane of the individual using the traditional computer keyboard. Specifically, the keyboard bisector is located such that the keyboard bisector is in the sagittal plane when the left-hand and the right-hand of the user are placed on the traditional computer keyboard in the normal typing position. The rows formed by the key set of a traditional computer keyboard are perpendicular to the keyboard bisector.

Each key contained in the key set displays an image. The image presents an indicia that is used to indicate an alphanumeric character used in written communication. The ordering of the keys in the key set of the traditional computer keyboard is organized according to an established standard often referred to as the QWERTY.

There are two drawbacks to using a traditional computer keyboard.

The first drawback is that the orientation of critical keys within the key set is not aligned with the orientation of the hands of the user using the key set. Specifically, there are four orientation concerns. First, when the arms of an individual are raised to a position that is parallel to the traverse plane of the individual, the elbow of each arm forms a first cant in the forearm of the individual relative to the sagittal plane and, by implication, the keyboard bisector. Second, the wrist forms a second cant relative to the first cant of the forearm. Third, the mechanical structure of the hand requires that each finger of the hand forms an individual cant relative to the second cant. When combined, the first cant, the second cant, and the individual cants result in a nominal angle of attack of a finger to the key set that ranges between 25 degrees and 65 degrees.

In the fourth orientation concern, the span of the length of the fingers of the hand differs from each other such that the angle of attack of each finger placed on traditional computer keyboard will vary in a suboptimal manner that reduces typing speed and causes hand fatigue.

The second drawback is the use of the QWERTY ordering of the key set. The QWERTY ordering is a well-known and documented ordering that the applicant believes first appeared in the prior art in USPTO Grant US209559A (Sholes FIG. 3). While many stories exist about the QWERTY, the primary disadvantages of using a QWERTY keyboard are the difficulty in learning how to use the QWERTY ordering and what many consider to be unnecessary hand movement (for example when typing a vowel) while using a QWERTY keyboard.

Clearly, a keyboard that addresses the above concerns would be of benefit.

SUMMARY OF INVENTION

This disclosure addresses the shortcomings of the traditional computer keyboard described above.

The ergonomic computer keyboard is configured for use with a computer. The ergonomic computer keyboard is adapted for use with a person. The ergonomic computer keyboard is an interface device that enables a person to use the computer. The ergonomic computer keyboard comprises a housing and a key set. The key set is installed in the housing. The orientation of the key set is set such that the angle of attack of a finger to a key selected from the key set key is adjusted relative to a traditional computer keyboard. This adjusted orientation results in a more natural orientation of the hands to the key set relative to the traditional computer keyboard. The ordering of the indicia of each key in the key set is adjusted relative to the QWERTY ordering to minimize hand movements during the typing process.

These together with additional objects, features and advantages of the ergonomic computer keyboard will be readily apparent to those of ordinary skill in the art upon reading the following detailed description of the presently preferred, but nonetheless illustrative, embodiments when taken in conjunction with the accompanying drawings.

In this respect, before explaining the current embodiments of the ergonomic computer keyboard in detail, it is to be understood that the ergonomic computer keyboard is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ergonomic computer keyboard.

It is therefore important that the claims be regarded as including such equivalent construction insofar as they do not depart from the spirit and scope of the ergonomic computer keyboard. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
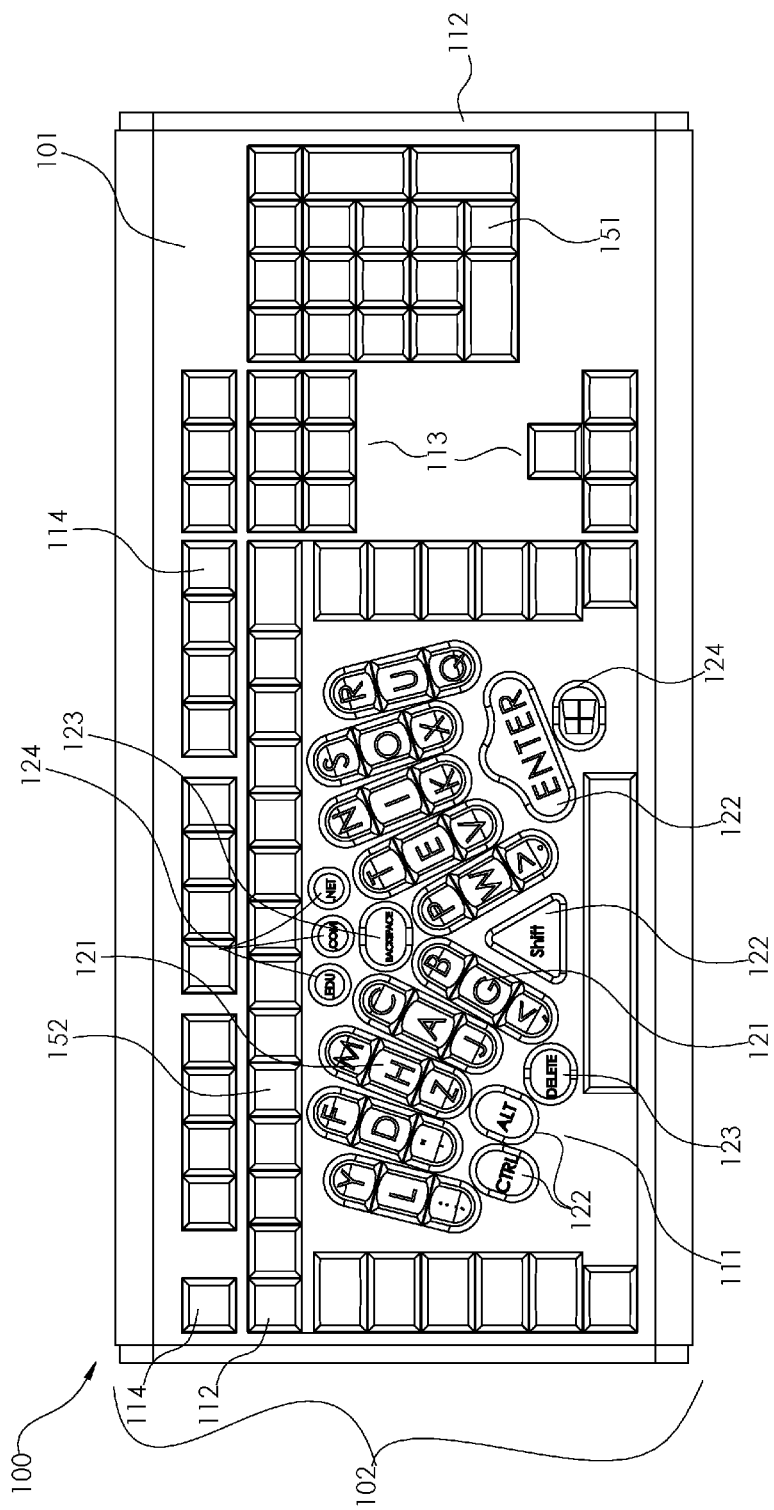
FIG. 1 is a front view of an embodiment of the disclosure.
Figure 2:
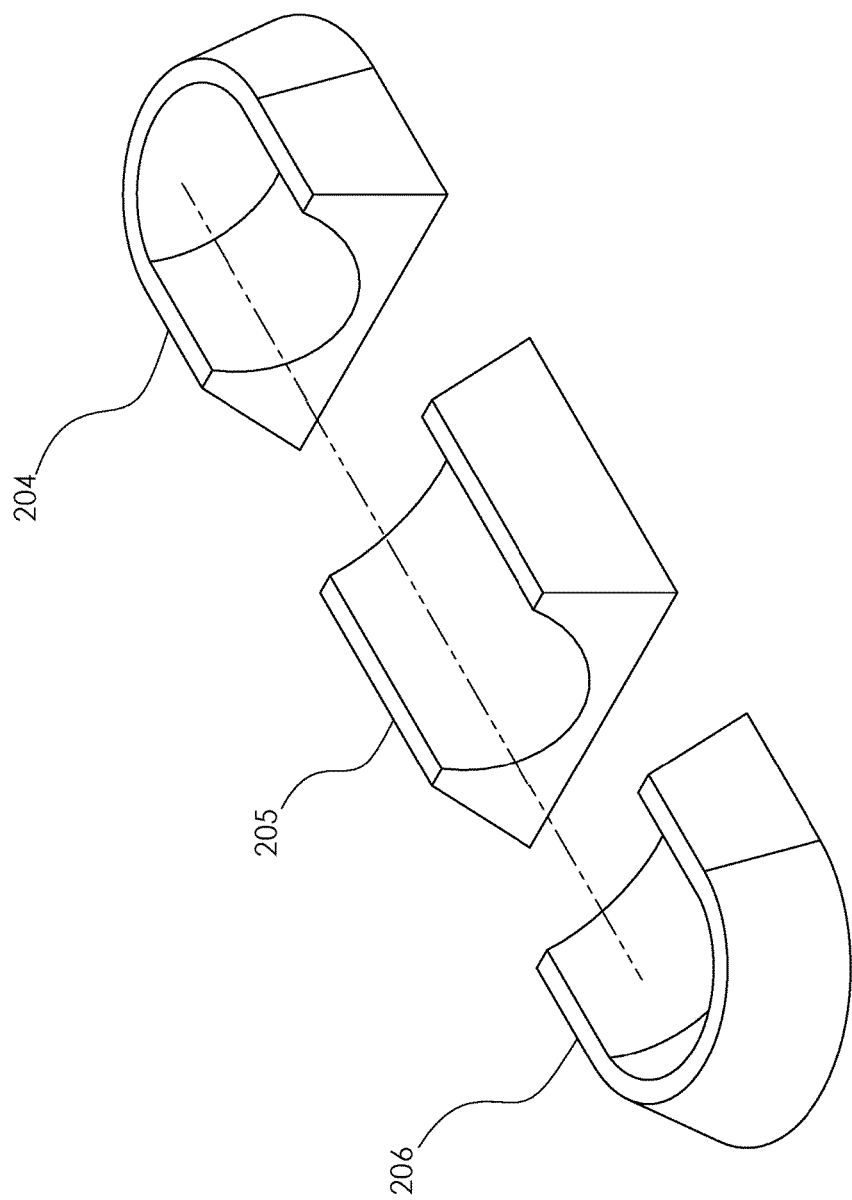
FIG. 2 is a close-up detail view of an embodiment of the disclosure.
Figure 3:
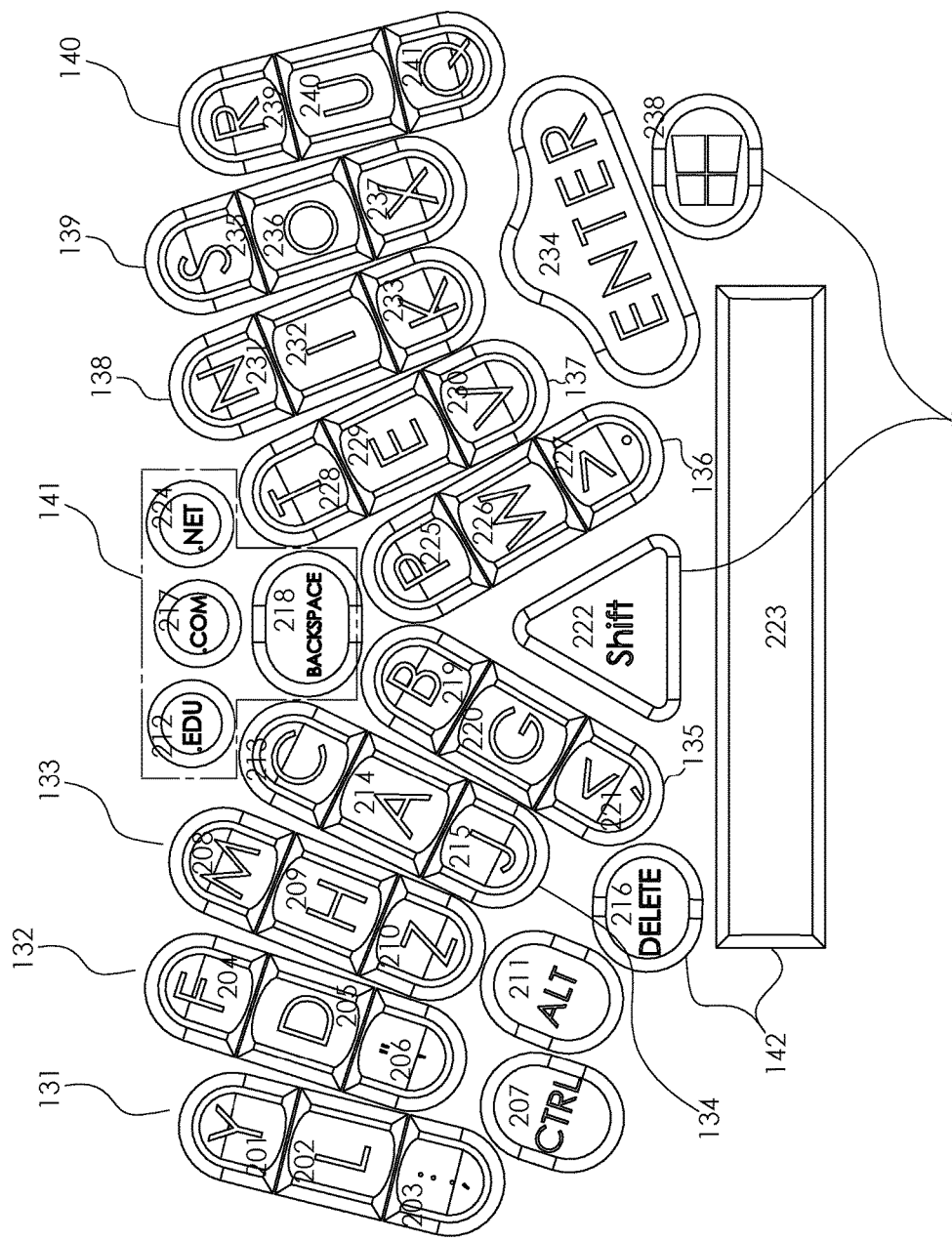
FIG. 3 is a detail view of an embodiment of the disclosure.
Figure 4:
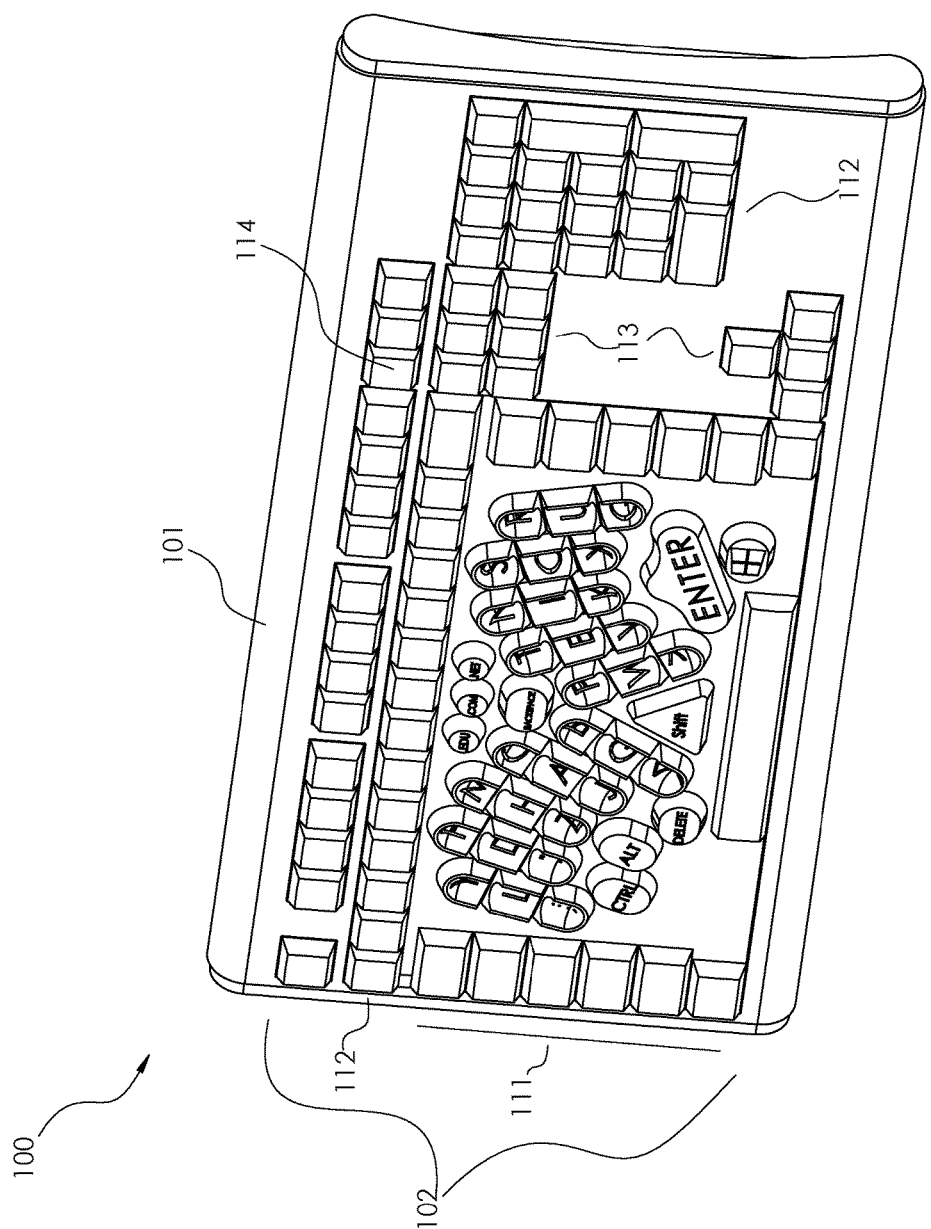
FIG. 4 is a perspective view of an embodiment of the disclosure.
Figure 5:
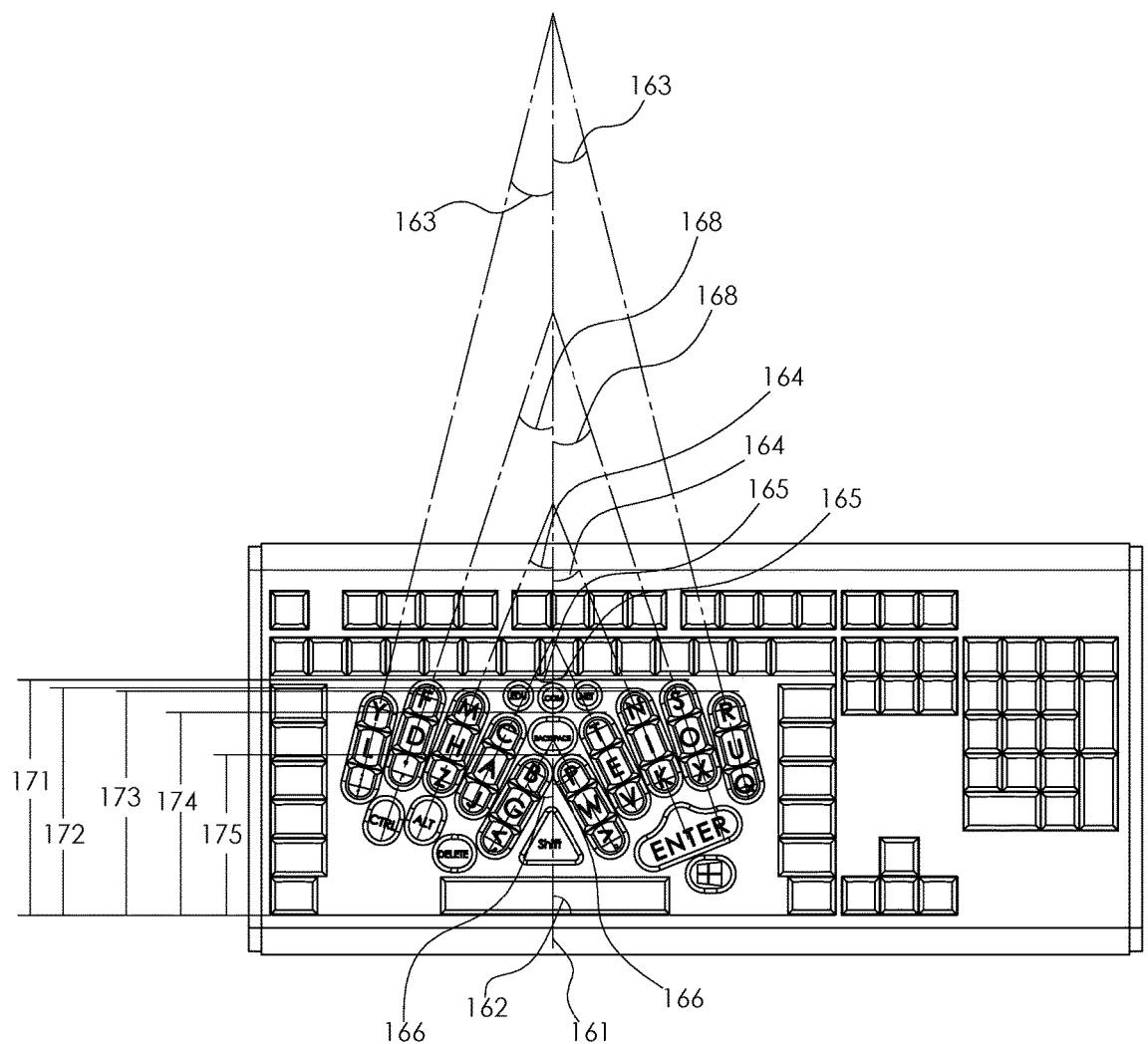
FIG. 5 is a detail view of an embodiment of the disclosure.

Detailed reference will now be made to one or more potential embodiments of the disclosure, which are illustrated in FIGS. 1 through 5.

The ergonomic computer keyboard 100 (hereinafter invention) is configured for use with a computer. The invention 100 is adapted for use with a person. The invention 100 is an interface device that enables a person to use the computer. The invention 100 comprises a housing 101 and a key set 102. The key set 102 installs in the housing 101. The orientation of the key set 102 is rectilinear. The rectilinear orientation of the key set 102 is set such that the angle of attack of a finger to a key selected from the key set 102 key is adjusted relative to a rectangular orientation traditional computer keyboard. This adjusted orientation results in a more natural orientation of the hands to the key set 102 relative to the traditional computer keyboard. The ordering of the indicia of each key in the key set 102 is adjusted relative to the QWERTY ordering to minimize hand movements during the typing process.

The housing 101 is a casing. The housing 101 contains the key set 102. The housing 101 is formed with all apertures and form factors necessary to allow the housing 101 to accommodate the use of the key set 102. The housing 101 further contains a plurality of momentary switches. Each momentary switch is actuated by a key selected from the key set 102. Each of the plurality of momentary switches is monitored by the computer such that the computer will initiate preprogrammed activities according to the keystrokes monitored from the key set 102. The construction of the housing 101 described in this paragraph is well-known and documented in the electrical arts.

The housing 101 is further defined with a keyboard bisector 161. The keyboard bisector 161 refers to a plane that bifurcates the invention 100. The keyboard bisector 161 corresponds to the keyboard bisector 161 of a traditional computer keyboard. The perpendicular keyboard angle 162 refers to the angle of an axis along the posterior edge of the housing 101 that is perpendicular to the keyboard bisector 161.

An approximate fourteen-degree keyboard angle 163 is an angle formed between the keyboard bisector 161 and an intersecting line that forms a cant with a span of an arc between twenty-five degrees and thirty-five degrees (inclusive). An approximate forty-degree keyboard angle 164 is an angle formed between the keyboard bisector 161 and an intersecting line that forms a cant with a span of an arc between thirty-five degrees and forty-five degrees (inclusive). An approximate fifty-degree keyboard angle 165 is an angle formed between the keyboard bisector 161 and an intersecting line that forms a cant with a span of an arc between forty-five degrees and fifty-five degrees (inclusive). An approximate sixty-degree keyboard angle 166 is an angle formed between the keyboard bisector 161 and an intersecting line that forms a cant with a span of an arc between fifty-five degrees and sixty-five degrees (inclusive).

The key set 102 comprises a collection of individual buttons referred to as keys. Any key selected from the key set 102 is used to actuate a momentary switch contained within the housing 101. The keys of the key set 102 are depressed by a user as a part of the interface process between the user and the computer. Each key selected from the key set 102 is marked with an indicia that identifies a sentiment associated with the operation of the selected key. Each key selected from the key set 102 is spring loaded such that the selected key will return to its primary position after the selected key has been depressed. The key set 102 comprises a plurality of primary keys 111, a plurality of number keys 112, a plurality of control keys 113, and a plurality of function keys 114.

Each of the plurality of number keys 112 is a key that is used to input a numeric symbol used in the creation of written communication. In the first potential embodiment of the disclosure, the orientation and the ordering of the plurality of number keys 112 is consistent with the position of the corresponding keys on a traditional computer keyboard. The plurality of number keys 112 comprises a keypad 151 and a number row 152.

The keypad 151 refers to a cluster of numbers and symbols associated with the entry and evaluation of numeric data. In the first potential embodiment of the disclosure, the orientation and the ordering of the keypad 151 is consistent with the position of the corresponding keys on a traditional computer keyboard. This disclosure assumes that the keypad 151 is identical to the keypad 151 found on a traditional computer keyboard. The number row 152 refers to a row of numbers and symbols associated with the entry and evaluation of numeric data. In the first potential embodiment of the disclosure, the orientation and the ordering of the number row 152 is consistent with the position of the corresponding keys on a traditional computer keyboard. This disclosure assumes that the number row 152 is identical to the number row 152 found on a traditional computer keyboard.

Each of the plurality of control keys 113 is a key that is used to control the focus of the computer as determined by the location of the cursor. In the first potential embodiment of the disclosure, the orientation and the ordering of the plurality of control keys 113 is consistent with the position of the corresponding keys on a traditional computer keyboard.

Each of the plurality of function keys 114 is a key that is used to initiate a programmed function or service available from the computer. In the first potential embodiment of the disclosure, the orientation and the ordering of the plurality of function keys 114 is consistent with the position of the corresponding keys on a traditional computer keyboard.

Each of the plurality of primary keys 111 is a key that is used to input a letter or symbol used in the creation of written communication. In the first potential embodiment of the disclosure, the orientation and the ordering of the plurality of primary keys 111 is changed relative to the position of the corresponding keys on a traditional computer keyboard. The plurality of primary keys 111 comprises a plurality of letter keys 121, a plurality of modifier keys 122, a plurality of correction keys 123, and a plurality of hotkeys 124.

Each of the plurality of letter keys 121 is a key that is used to input a letter or symbol used in the creation of written communication. The plurality of letter keys 121 comprises a first key 201, a second key 202, a third key 203, a fourth key 204, a fifth key 205, a sixth key 206, an eighth key 208, a ninth key 209, a tenth key 210, a thirteenth key 213, a fourteenth key 214, a fifteenth key 215, a nineteenth key 219, a twentieth key 220, a twenty-first key 221, a twenty-third key 223, a twenty-fifth key 225, a twenty-sixth key 226, a twenty-seventh key 227, a twenty-eighth key 228, a twenty-ninth key 229, a thirtieth key 230, a thirty-first key 231, a thirty-second key 232, a thirty-third key 233, a thirty-fifth key 235, a thirty-sixth key 236, a thirty-seventh key 237, a thirty-ninth key 239, a fortieth key 240, and a forty-first key 241.

The second key 202 is the home key for the left-hand little finger. The fifth key 205 is the home key for the left-hand ring finger. The ninth key 209 is the home key for the left-hand middle finger. The fourteenth key 214 is the home key for the left-hand index finger. The twenty-ninth key 229 is the home key for the right-hand index finger. The thirty-second key 232 is the home key for the right-hand middle finger. The thirty-sixth key 236 is the home key for the right-hand ring finger. The fortieth key 240 is the home key for the right-hand little finger.

Each of the plurality of modifier keys 122 is a key that is used to modify the operation of a key selected from the plurality of letter keys 121. Any of the plurality of modifier keys 122 operates by pressing a key selected from the plurality of modifier keys 122 simultaneously with a key selected from the plurality of letter keys 121 to modify the behavior of the key selected from the plurality of letter keys 121. For example, a capital z is indicated when the twenty-second key 222 is pressed simultaneously with the tenth key 210. This compares to the lower case z indicated when the tenth key 210 is pressed alone. Similarly, simultaneously pressing the seventh key 207 with the thirty-fifth key 235 will cause many computers to save unsaved work instead of presenting the lower case s associated with the thirty-fifth key 235. The use of the plurality of modifier keys 122 is well-known and documented in the computer arts. The plurality of modifier keys 122 comprises a seventh key 207, an eleventh key 211, and a twenty-second key 222.

The plurality of correction keys 123 are keys dedicated to correcting data entry errors. Each of the plurality of correction keys 123 deletes unwanted data that was previously entered into the computer. The difference between each of the plurality of correction keys 123 is determined by the location of the data that is deleted relative to the position of the cursor. The plurality of correction keys 123 comprises a sixteenth key 216 and an eighteenth key 218.

Each of the plurality of hotkeys 124 initiates the computer to initiate a previously programmed function. The plurality of hotkeys 124 comprises a twelfth key 212, a seventeenth key 217, a twenty-fourth key 224, a thirty-fourth key 234, and a thirty-eighth key 238. In the first potential embodiment of the disclosure, depressing the twelfth key 212 instructs the computer to enter the text ".edu" into the text currently being entered through the invention 100. The seventeenth key 217 instructs the computer to enter the text ".com" into the text currently being entered through the invention 100. The twenty-fourth key 224 instructs the computer to enter the text ".net" into the text currently being entered through the invention 100. The thirty-fourth key 234 instructs the computer to initiate the operation of the most recent instructions received by the computer through the invention 100. The thirty-eighth key 238 instructs the computer to switch the mode of the operating system when the invention 100 is used with certain operating systems.

The plurality of primary keys 111 further comprises a first column 131, a second column 132, a third column 133, a fourth column 134, a fifth column 135, a sixth column 136, a seventh column 137, an eighth column 138, a ninth column 139, a tenth column 140, a plurality of upper flat keys 141, and a plurality of lower flat keys 142.

The alignment of the keys in the first column 131 is further defined by a center axis. The alignment of the keys in the second column 132 is further defined by a center axis. The alignment of the keys in the third column 133 is further defined by a center axis. The alignment of the keys in the fourth column 134 is further defined by a center axis. The alignment of the keys in the fifth column 135 is further defined by a center axis.

The alignment of the keys in the sixth column 136 is further defined by a center axis. The alignment of the keys in the seventh column 137 is further defined by a center axis. The alignment of the keys in the eighth column 138 is further defined by a center axis. The alignment of the keys in the ninth column 139 is further defined by a center axis. The alignment of the keys in the tenth column 140 is further defined by a center axis.

The first column 131 comprises the first key 201, the second key 202, and the third key 203. In the first column 131, the first key 201 is located in an anterior position relative to the second key 202, which is located in an anterior position relative to the third key 203. The first column 131 is positioned such that the center axis of the first column 131 intersects with the keyboard bisector 161 to form an approximate fourteen-degree keyboard angle 163.

The second column 132 comprises the fourth key 204, the fifth key 205, the sixth key 206, and the seventh key 207. In the second column 132, the fourth key 204 is located in an anterior position relative to the fifth key 205, which is located in an anterior position relative to the sixth key 206 which is located in an anterior position relative to the seventh key 207. The second column 132 is positioned such that the center axis of the second column 132 intersects with the keyboard bisector 161 to form an approximate eighteen-degree keyboard angle 168.

The third column 133 comprises the eighth key 208, the ninth key 209, the tenth key 210, and the eleventh key 211. In the third column 133, the eighth key 208 is located in an anterior position relative to the ninth key 209, which is located in an anterior position relative to the tenth key 210, which is located in an anterior position relative to the eleventh key 211. The third column 133 is positioned such that the center axis of the third column 133 intersects with the keyboard bisector 161 to form an approximate twenty-two-degree keyboard angle 164.

The fourth column 134 comprises the thirteenth key 213, the fourteenth key 214, and the fifteenth key 215. In the fourth column 134, the thirteenth key 213 is located in an anterior position relative to the fourteenth key 214, which is located in an anterior position relative to the fifteenth key 215. The fourth column 134 is positioned such that the center axis of the fourth column 134 intersects with the keyboard bisector 161 to form an approximate twenty-six-degree keyboard angle 165.

The fifth column 135 comprises the nineteenth key 219, the twentieth key 220, and the twenty-first key 221. In the fifth column 135, the nineteenth key 219 is located in an anterior position relative to the twentieth key 220, which is located in an anterior position relative to the twenty-first key 221. The fifth column 135 is positioned such that the center axis of the fifth column 135 intersects with the keyboard bisector 161 to form an approximate thirty-degree keyboard angle 166.

The sixth column 136 comprises the twenty-fifth key 225, the twenty-sixth key 226, and the twenty-seventh key 227. In the sixth column 136, the twenty-fifth key 225 is located in an anterior position relative to the twenty-sixth key 226, which is located in an anterior position relative to the twenty-seventh key 227. The sixth column 136 is positioned such that the center axis of the sixth column 136 intersects with the keyboard bisector 161 to form an approximate thirty-degree keyboard angle 166.

The seventh column 137 comprises the twenty-eighth key 228, the twenty-ninth key 229, and the thirtieth key 230. In the seventh column 137, the twenty-eighth key 228 is located in an anterior position relative to the twenty-ninth key 229, which is located in an anterior position relative to the thirtieth key 230. The seventh column 137 is positioned such that the center axis of the seventh column 137 intersects with the keyboard bisector 161 to form an approximate twenty-six-degree keyboard angle 165.

The eighth column 138 comprises the thirty-first key 231, the thirty-second key 232, the thirty-third key 233, and the thirty-fourth key 234. In the eighth column 138, the thirty-first key 231 is located in an anterior position relative to the thirty-second key 232, which is located in an anterior position relative to the thirty-third key 233 which is located in an anterior position relative to the thirty-fourth key 234. The eighth column 138 is positioned such that the center axis of the eighth column 138 intersects with the keyboard bisector 161 to form an approximate twenty-two-degree keyboard angle 164.

The ninth column 139 comprises the thirty-fifth key 235, the thirty-sixth key 236, and the thirty-seventh key 237. In the ninth column 139, the thirty-fifth key 235 is located in an anterior position relative to the thirty-sixth key 236, which is located in an anterior position relative to the thirty-seventh key 237. The ninth column 139 is positioned such that the center axis of the ninth column 139 intersects with the keyboard bisector 161 to form an approximate eighteen-degree keyboard angle 168.

The tenth column 140 comprises the thirty-ninth key 239, the fortieth key 240, and the forty-first key 241. In the tenth column 140, the thirty-ninth key 239 is located in an anterior position relative to the fortieth key 240, which is located in an anterior position relative to the forty-first key 241. The tenth column 140 is positioned such that the center axis of the tenth column 140 intersects with the keyboard bisector 161 to form an approximate fourteen-degree keyboard angle 163.

The plurality of upper flat keys 141 refers to a cluster of mode and correction keys located in the anterior region of the plurality of primary keys 111. The plurality of upper flat keys 141 comprises the twelfth key 212, the seventeenth key 217, the eighteenth key 218, and the twenty-fourth key 224.

The plurality of lower flat keys 142 refers to a cluster of modifier, mode and correction keys located in the posterior region of the plurality of primary keys 111. The plurality of lower flat keys 142 comprises the sixteenth key 216, the twenty-second key 222, the twenty-third key 223, and the thirty-eighth key 238.

The following five paragraphs describe the positioning of the first column 131 through the tenth column 140 on the housing 101.

A ring finger span 171 refers the span of the perpendicular distance from the anterior tip of both the fourth key 204 and the thirty-fifth key 235 to the axis formed by the posterior edge of the housing 101. The ring finger span 171 is sized to accommodate the length of both the left-hand and the right-hand ring fingers.

The middle finger span 172 is the span of the perpendicular distance from the anterior tip of both the eighth key 208 and the thirty-first key 231 to the axis formed by the posterior edge of the housing 101. The middle finger span 172 is sized to accommodate the length of both the left-hand and the right-hand middle fingers. The span of the ring finger span 171 is greater than the span of the middle finger span 172.

A little finger span 173 refers the span of the perpendicular distance from the anterior tip of both the first key 201 and the thirty-ninth key 239 to the axis formed by the posterior edge of the housing 101. The little finger span 173 is sized to accommodate the length of both the left-hand and the right-hand little fingers. The span of the middle finger span 172 is greater than the span of the little finger span 173.

An index finger span 174 refers the span of the perpendicular distance from the anterior tip of both the thirteenth key 213 and the twenty-eighth key 228 to the axis formed by the posterior edge of the housing 101. The index finger span 174 is sized to accommodate the length of both the left-hand and the right-hand index fingers. The span of the little finger span 173 is greater than the span of the index finger span 174.

A secondary index finger span 175 refers the span of the perpendicular distance from the anterior tip of both the nineteenth key 219 and the twenty-fifth key 225 to the axis formed by the posterior edge of the housing 101. The secondary index finger span 175 is sized to accommodate the length of both the left-hand and the right-hand index fingers. The span of the index finger span 174 is greater than the span of the secondary index finger span 175.

The following three paragraphs describe the indicia displayed on the plurality of primary keys 111 in the first potential embodiment of the disclosure.

The first key 201 indicates the y key. The second key 202 indicates the l key. The third key 203 indicates the semicolon and colon key. The fourth key 204 indicates the f key. The fifth key 205 indicates the d key. The sixth key 206 indicates the comma key. The seventh key 207 indicates the ctrl key. The eighth key 208 indicates the m key. The ninth key 209 indicates the h key. The tenth key 210 indicates the z key. The eleventh key 211 indicates the alt key. The twelfth key 212 indicates the dot edu key. The thirteenth key 213 indicates the c key. The fourteenth key 214 indicates the a key. The fifteenth key 215 indicates the j key. The sixteenth key 216 indicates the delete key.

The seventeenth key 217 indicates the dot com key. The eighteenth key 218 indicates the backspace key. The nineteenth key 219 indicates the b key. The twentieth key 220 indicates the g key. The twenty-first key 221 indicates the less than and comma key. The twenty-second key 222 indicates the shift key. The twenty-third key 223 indicates the spacebar key. The twenty-fourth key 224 indicates the dot net key.

The twenty-fifth key 225 indicates the p key. The twenty-sixth key 226 indicates the w key. The twenty-seventh key 227 indicates the greater than and period key. The twenty-eighth key 228 indicates the t key. The twenty-ninth key 229 indicates the e key. The thirtieth key 230 indicates the v key. The thirty-first key 231 indicates the n key. The thirty-second key 232 indicates the i key. The thirty-third key 233 indicates the k key. The thirty-fourth key 234 indicates the enter key. The thirty-fifth key 235 indicates the s key. The thirty-sixth key 236 indicates the o key. The thirty-seventh key 237 indicates the x key. The thirty-eighth key 238 indicates the mode key. The thirty-ninth key 239 indicates the r key. The fortieth key 240 indicates the u key. The forty-first key 241 indicates the q key.

The following two paragraphs describe the ordering of the indicia on the plurality of letter keys 121.

The letter e is placed on the twenty-ninth key 229. The letter "a" is placed on the fourteenth key 214. The remaining vowels are placed on the thirty-second key 232, the thirty-sixth key 236, and the fortieth key 240. In order of precedence, the consonants are assigned to keys in the following order: ninth key 209, the fifth key 205, the second key 202, the twenty-eighth key 228, the thirty-first key 231, the thirty-fifth key 235, the thirty-ninth key 239, the thirteenth key 213, the eighth key 208, the fourth key 204, the first key 201, the twenty-sixth key 226, the twentieth key 220, the twenty-fifth key 225, the nineteenth key 219, the thirtieth key 230, the thirty-third key 233, the thirty-seventh key 237, the forty-first key 241, the twentieth key 220, the fifteenth key 215, and the tenth key 210.

In the first potential embodiment of the disclosure, the precedence of the plurality of letter keys 121 is the e key, the t key, the a key, the o key, the i key, the n key, the s key, the r key, the h key, the d key, the l key, the u key, the c key, the m key, the f key, the y key, the w key, the g key, the p key, the b key, the v key, the k key, the x key, the q key, the j key, and the z key. This precedence is based on a Cornell English letter frequency distribution analysis.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front, or face side, of a human body. When comparing two objects, the anterior object is the object that is closer to the front, or face side, of the human body. Within this disclosure, a finger will move in the anterior direction when the finger moves in a direction away from the anterior side of the associated individual.

Approximately: As used in this disclosure, the term approximately is applied to an angle to indicate that the nominal span of the arc of the angle can vary by a span of plus or minus 5 degrees of arc (inclusive).

Arc: As used in this disclosure, an arc refers to a portion of a circumference or a curved perimeter. When applied to an angle, the arc also refers to a measure of an angular span as measured from a circle at the vertex formed by the sides of the angle.

Cant: As used in this disclosure, a cant is an angular deviation from one or more reference lines (or planes) such as a vertical line (or plane) or a horizontal line (or plane).

Computer: As used in this disclosure, a computer is a programmable electrical device that processes externally provided inputs to generate outputs determined from a previously programmed set of instructions.

Coronal Plane: As used in this disclosure, the coronal plane refers to a reference plane that bisects an anterior surface and posterior surface.

Form Factor: As used in this disclosure, the term form factor refers to the size and shape of an object.

Housing: As used in this disclosure, a housing is a rigid casing that encloses and protects one or more devices.

Image: As used in this disclosure, an image is an optical representation or reproduction of an indicia of the appearance of something or someone.

Indicia: As used in this disclosure, the term indicia refers to a set of markings that identify a sentiment. See sentiment Inferior: As used in this disclosure, inferior refers to a directional sense or location of the body. Specifically, inferior refers to an object or a side of an object that is proximal to the feet or distal from the head of the body.

Interface: As used in this disclosure, an interface is a physical or virtual boundary that separates two different systems across which information is exchanged.

Lateral: As used in this disclosure, the term lateral refers to the movement of an object that is perpendicular to the previously determined or expected direction of movement of the object. Lateral movement is always perpendicular to the anterior-posterior axis.

Lateral Plane: As used in this disclosure, the lateral plane refers to a reference plane that bisects an anterior surface and posterior surface. The lateral plane is always perpendicular to the anterior-posterior axis and is always parallel to the coronal axis.

Medial: As used in this disclosure, medial refers to a directional sense or location of the body. Specifically, medial refers to an object or a side of an object that is proximal to the medial axis or distal from the side body.

Medial Axis: As used in this disclosure, the medial axis is the center line of the body as the line is drawn from the head to the foot. When two objects are compared relative to the medial axis, the object closer to the medial axis is referred to as the medial object and the object distal from the medial axis is referred to as the lateral object.

Momentary Switch: As used in this disclosure, a momentary switch is a biased switch in the sense that the momentary switch has a baseline position that only changes when the momentary switch is actuated (for example when a pushbutton switch is pushed). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Nominal: As used in this disclosure, the term nominal refers to a designed or intended value of the measure of a physical parameter of an object. The use of the term nominal implies that the exact value of the physical parameter of an instantiation of the object can have insignificant variation from the nominal value. By insignificant is meant that these variations will not interfere with the intended use of the object. The sources of variations can include, but are not limited to, manufacturing tolerances and traditional rounding practices such as those employed in the sale of lumber or plumbing supplies.

Posterior: As used in this disclosure, posterior is a term that is used to refer to the side of a human body that is distal from the anterior side. When comparing two objects, the posterior object is the object that is distal from the anterior side of the human body. Within this disclosure, a finger will move in the posterior direction when the finger moves in a direction towards the anterior side of the associated individual.

Sagittal Plane: As used in this disclosure, the sagittal plane refers to a plane that is perpendicular to the both the coronal (or lateral) plane and the transverse plane.

Sentiment: As used in this disclosure, a sentiment refers to a symbolic meaning or message that is communicated through the use of an image, potentially including a text-based image.

Superior: As used in this disclosure, superior refers to a directional sense or location of the body. Specifically, superior refers to an object or a side of an object that is distal from the feet or proximal to the head of the body. Alternately, the term superior refers to a directional reference that is parallel to and in the opposite direction of the force of gravity. The selection between these alternate definitions is determined from the context of the text. In cases where the context is unclear, the alternate definition should be used.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Transverse Plane: As used in this disclosure, a transverse plane is a plane that divides an object into a superior section and an inferior section. In a person, the transverse plane would be perpendicular to the medial axis of a body.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An ergonomic input arrangement being an interface device and enabling a user to use with a computer, the ergonomic input arrangement comprising:
   a housing and a key set; wherein the housing is a casing that contains the key set; wherein the housing is further defined with an anterior direction and a posterior direction;
   wherein the key set comprises an orientation being adjusted relative to the QWERTY ordering; the adjusted orientation resulting in a more natural orientation of human hands to minimize movements of the user's hands while using the ergonomic input arrangement;
   wherein the orientation of the keyset comprises a first column, a second column, a third column, a fourth column, a fifth column, a sixth column, a seventh column, a ninth column, and a tenth column;
   wherein each column comprises a plural of keys contained in the key set; each key contained in the key set displaying an image that presents an indicia that is used to indicate an alpha-numeric character used in written communication, and each key contained in the key set containing a momentary switch that is actuated by a key selected from the key set;
   the housing being further defined with a keyboard bisector referring to a plane that bifurcates the ergonomic input arrangement;
   wherein the housing is further defined with a perpendicular keyboard angle, an approximate fourteen degree keyboard angle, an approximate eighteen-degree keyboard angle, an approximate twenty-two-degree keyboard angle, an approximate twenty-six-degree keyboard angle, and an approximate thirty-degree keyboard angle;
   wherein the perpendicular keyboard angle refers to the angle of an axis along the posterior edge of the housing that is perpendicular to the keyboard bisector;
   wherein the first column and the tenth column are positioned such that the corresponding center axis of the first column and the tenth column intersect with the keyboard bisector to form the approximate fourteen-degrees keyboard angle;
   wherein the second column and the ninth column are positioned such that the corresponding center axis of the second column and the ninth column intersect with the keyboard bisector to form the approximate eighteen-degree keyboard angle;
   wherein the third column and the eighth column are positioned such that the corresponding center axis of the third column and the eighth column intersect with the keyboard bisector to form the approximate twenty-two degree keyboard angle;
   wherein the fourth column and the seventh column are positioned such that the corresponding center axis of the fourth column and the seventh column intersect with the keyboard bisector to form the approximate twenty-six degree keyboard angle;

wherein the fifth column and the sixth column are positioned such that the corresponding center axis of the fifth column and the sixth column intersect with the keyboard bisector to form the approximate thirty-degree keyboard angle;

wherein the approximate eighteen-degree keyboard angle is an angle formed between the keyboard bisector and an intersecting line that forms a cant with a span of an arc between twenty-five degrees and thirty-five degrees;

wherein the approximate twenty-two-degree keyboard angle is an angle formed between the keyboard bisector and an intersecting line that forms a cant with a span of an arc between thirty-five degrees and forty-five degrees;

wherein the approximate twenty-six-degree keyboard angle is an angle formed between the keyboard bisector and an intersecting line that forms a cant with a span of an arc between forty-five degrees and fifty-five degrees;

wherein an approximate thirty-degree keyboard angle is an angle formed between the keyboard bisector and an intersecting line that forms a cant with a span of an arc between fifty-five degrees and sixty-five degrees.

2. The ergonomic input arrangement according to claim 1
wherein the key set comprises a collection of individual buttons referred to as keys;
wherein each key selected from the key set actuates a momentary switch;
wherein the keys of the key set are depressed as a part of an interface process with the computer;
wherein each key selected from the key set is spring loaded; and
wherein each key selected from the key set returns to its primary position after the selected key has been depressed.

3. The input arrangement according to claim 2
wherein the key set comprises a plurality of number keys;
wherein each of the plurality of number keys is a key that inputs a numeric symbol used in a creation of written communication to the computer;
wherein the plurality of number keys comprises a keypad and a number row;
wherein the keypad refers to a cluster of numbers and symbols associated with an entry and evaluation of numeric data;
wherein the number row refers to a row of numbers and symbols associated with an entry and evaluation of numeric data.

4. The input arrangement according to claim 3
wherein the key set comprises a plurality of control keys, and a plurality of function keys;
wherein each of the plurality of control keys is a key that is used to control a focus of the computer as determined by a location of a cursor;
wherein each of the plurality of function keys is a key that is used to initiate a programmed function or service available from the computer.

5. The input arrangement according to claim 4
wherein the key set comprises a plurality of primary keys;
wherein each of the plurality of primary keys is a key that is used to input a letter or symbol used in the creation of written communication;
wherein the letter is not numeric;
wherein the symbol is not numeric.

6. The input arrangement according to claim 5
wherein the plurality of primary keys comprises a plurality of letter keys, a plurality of modifier keys, a plurality of correction keys, and a plurality of hotkeys;
wherein each of the plurality of letter keys is a key that is used to input a letter or symbol used in the creation of written communication;
wherein each of the plurality of modifier keys is a key that is used to modify an operation of a key selected from the plurality of letter keys; wherein any of the plurality of modifier keys operates by pressing a key selected from the plurality of modifier keys simultaneously with a key selected from the plurality of letter keys to modify the behavior of the key selected from the plurality of letter keys;
wherein the plurality of correction keys are keys dedicated to correcting data entry errors;
wherein each of the plurality of correction keys deletes unwanted data that was previously entered into the computer;
wherein each of the plurality of hotkeys initiates the computer to initiate a previously programmed function.

7. The input arrangement according to claim 6
wherein the plurality of letter keys comprises a first key, a second key, a third key, a fourth key, a fifth key, a sixth key, an eighth key, a ninth key, a tenth key, a thirteenth key, a fourteenth key, a fifteenth key, a nineteenth key, a twentieth key, a twenty-first key, a twenty-third key, a twenty-fifth key, a twenty-sixth key, a twenty-seventh key, a twenty-eighth key, a twenty-ninth key, a thirtieth key, a thirty-first key, a thirty-second key, a thirty-third key, a thirty-fifth key, a thirty-sixth key, a thirty-seventh key, a thirty-ninth key, a fortieth key, and a forty-first key;
wherein the first key indicates a letter y key;
wherein the second key indicates a letter l key;
wherein the third key indicates a semicolon and colon key;
wherein the fourth key indicates a letter f key;
wherein the fifth key indicates a letter d key;
wherein the sixth key indicates a comma key;
wherein the eighth key indicates a letter m key;
wherein the ninth key indicates a letter h key;
wherein the tenth key indicates a letter z key;
wherein the thirteenth key indicates a letter c key;
wherein the fourteenth key indicates a letter a key;
wherein the fifteenth key indicates a letter j key;
wherein the nineteenth key indicates a letter b key;
wherein the twentieth key indicates a letter g key;
wherein the twenty-first key indicates a less than and comma key;
wherein the twenty-third key indicates a spacebar key;
wherein the twenty-fifth key indicates a letter p key;
wherein the twenty-sixth key indicates a letter w key;
wherein the twenty-seventh key indicates a greater than and period key;
wherein the twenty-eighth key indicates a letter t key;
wherein the twenty-ninth key indicates a letter e key;
wherein the thirtieth key indicates a letter v key;
wherein the thirty-first key indicates a letter n key;
wherein the thirty-second key indicates a letter i key;
wherein the thirty-third key indicates a letter k key;
wherein the thirty-fifth key indicates a letter s key;
wherein the thirty-sixth key indicates a letter o key;
wherein the thirty-seventh key indicates a letter x key;
wherein the thirty-ninth key indicates a letter r key;
wherein the fortieth key indicates a letter u key;
wherein the forty-first key indicates a letter q key.

8. The input arrangement according to claim 7
wherein the plurality of modifier keys comprises a seventh key, an eleventh key, and a twenty-second key;
wherein the seventh key indicates a Ctrl key;
wherein the eleventh key indicates an alt key; and
wherein the twenty-second key indicates a shift key.

9. The input arrangement according to claim 8
wherein the plurality of correction keys comprises a sixteenth key and an eighteenth key;
wherein the sixteenth key indicates a delete key; and
wherein the eighteenth key indicates a backspace key.

10. The input arrangement according to claim 9
wherein the plurality of hotkeys comprises a twelfth key, a seventeenth key, a twenty-fourth key, a thirty-fourth key, and a thirty-eighth key;
wherein the twelfth key indicates a ".edu" key;
wherein the seventeenth key indicates a ".com" key;
wherein the twenty-fourth key indicates a ".net" key;
wherein the thirty-fourth key indicates an enter key;
wherein the thirty-eighth key indicates a mode key.

11. The input arrangement according to claim 10
wherein depressing the twelfth key instructs the computer to enter a text ".edu" into the creation of written communication currently being entered through the ergonomic input arrangement;
wherein the seventeenth key instructs the computer to enter a text ".com" into the creation of written communication currently being entered through the ergonomic input arrangement;
wherein the twenty-fourth key instructs the computer to enter a text ".net" into the creation of written communication currently being entered through the ergonomic input arrangement;
wherein the thirty-fourth key instructs the computer to initiate an operation of the most recent instructions received by the computer through the ergonomic input arrangement;
wherein the thirty-eighth key instructs the computer to switch the mode of the operating system.

12. The input arrangement according to claim 11
wherein the plurality of letter keys comprises a sub-plurality of home keys;
wherein each of the sub-plurality of home keys are reference points used to identify the location of each of the plurality of primary keys;
wherein the second key is a home key of the first column;
wherein the fifth key is a home key of the second column;
wherein the ninth key is a home key of the third column;
wherein the fourteenth key is a home key of the fourth column;
wherein the twenty-ninth key is a home key of the seventh column;
wherein the thirty-second key is a home key of the eighth column;
wherein the thirty-sixth key is a home key of the ninth column;
wherein the fortieth key is a home key of the tenth column;
wherein the twenty-ninth key is adapted to be positioned under the index finger of the right hand when in use;
wherein the fourteenth key is adapted to be positioned under the index finger of the left hand when in use.

13. The input arrangement according to claim 12
wherein the plurality of primary keys further comprises a plurality of upper flat keys, and a plurality of lower flat keys;
wherein an alignment of the keys in the first column is further defined by the corresponding center axis;
wherein an alignment of the keys in the second column is further defined by the corresponding center axis;
wherein an alignment of the keys in the third column is further defined by the corresponding center axis;
wherein an alignment of the keys in the fourth column is further defined by the corresponding center axis;
wherein an alignment of the keys in the fifth column is further defined by the corresponding center axis;
wherein an alignment of the keys in the sixth column is further defined by the corresponding center axis;
wherein an alignment of the keys in the seventh column is further defined by the corresponding center axis;
wherein an alignment of the keys in the eighth column is further defined by the corresponding center axis;
wherein an alignment of the keys in the ninth column is further defined by the corresponding center axis;
wherein an alignment of the keys in the tenth column is further defined by the corresponding center axis;
wherein the first column comprises the first key, the second key, and the third key;
wherein the second column comprises the fourth key, the fifth key, the sixth key, and the seventh key;
wherein the third column comprises the eighth key, the ninth key, the tenth key, and the eleventh key;
wherein the fourth column comprises the thirteenth key, the fourteenth key, and the fifteenth key;
wherein the fifth column comprises the nineteenth key, the twentieth key, and the twenty-first key;
wherein the sixth column comprises the twenty-fifth key, the twenty-sixth key, and the twenty-seventh key;
wherein the seventh column comprises the twenty-eighth key, the twenty-ninth key, and the thirtieth key;
wherein the eighth column comprises the thirty-first key, the thirty-second key, the thirty-third key, and the thirty-fourth key;
wherein the ninth column comprises the thirty-fifth key, the thirty-sixth key, and the thirty-seventh key;
wherein the tenth column comprises the thirty-ninth key, the fortieth key, and the forty-first key;
wherein the plurality of upper flat keys comprises the twelfth key, the seventeenth key, the eighteenth key, and the twenty-fourth key; and
wherein the plurality of lower flat keys comprises the sixteenth key, the twenty-second key, the twenty-third key, and the thirty-eighth key.

14. The input arrangement according to claim 13
wherein the first key is located in an anterior position relative to the second key which is located in an anterior position relative to the third key;
wherein the fourth key is located in an anterior position relative to the fifth key which is located in an anterior position relative to the sixth key which is located in an anterior position relative to the seventh key;
wherein the eighth key is located in an anterior position relative to the ninth key which is located in an anterior position relative to the tenth key which is located in an anterior position relative to the eleventh key;
wherein the thirteenth key is located in an anterior position relative to the fourteenth key which is located in an anterior position relative to the fifteenth key;
wherein the nineteenth key is located in an anterior position relative to the twentieth key which is located in an anterior position relative to the twenty-first key;

wherein the twenty-fifth key is located in an anterior position relative to the twenty-sixth key which is located in an anterior position relative to the twenty-seventh key;

wherein the twenty-eighth key is located in an anterior position relative to the twenty-ninth key which is located in an anterior position relative to the thirtieth key;

wherein the thirty-first key is located in an anterior position relative to the thirty-second key which is located in an anterior position relative to the thirty-third key which is located in an anterior position relative to the thirty-fourth key;

wherein the thirty-fifth key is located in an anterior position relative to the thirty-sixth key which is located in an anterior position relative to the thirty-seventh key;

wherein the thirty-ninth key is located in an anterior position relative to the fortieth key which is located in an anterior position relative to the forty-first key.

15. The input arrangement according to claim 14
wherein the plurality of primary keys further comprises a ring finger span, a middle finger span, a little finger span, an index finger span, and a secondary index finger span;

wherein the ring finger span is the span of the perpendicular distance from the anterior tip of both the fourth key and the thirty-fifth key to the axis formed by the posterior edge of the housing;

wherein the middle finger span is the span of the perpendicular distance from the anterior tip of both the eighth key and the thirty-first key to the axis formed by the posterior edge of the housing;

wherein the little finger span refers the span of the perpendicular distance from the anterior tip of both the first key and the thirty-ninth key to the axis formed by the posterior edge of the housing;

wherein the index finger span refers the span of the perpendicular distance from the anterior tip of both the thirteenth key and the twenty-eighth key to the axis formed by the posterior edge of the housing; and wherein the secondary index finger span refers the span of the perpendicular distance from the anterior tip of both the nineteenth key and the twenty-fifth key to the axis formed by the posterior edge of the housing.

16. The input arrangement according to claim 15
wherein the span of the ring finger span is greater than the span of the middle finger span;

wherein the span of the middle finger span is greater than the span of the little finger span;

wherein the span of the little finger span is greater than the span of the index finger span; and wherein the span of the index finger span is greater than the span of the secondary index finger span.

* * * * *